(12) United States Patent
Palejiya et al.

(10) Patent No.: US 10,960,875 B2
(45) Date of Patent: Mar. 30, 2021

(54) METHODS AND SYSTEM FOR SWITCHING DRIVELINE OPERATING MODES

(71) Applicant: Ford Global Technologies, LLC, Dearborn, MI (US)

(72) Inventors: Dushyant K. Palejiya, Canton, MI (US); Rajit Johri, Canton, MI (US); Jason Meyer, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 191 days.

(21) Appl. No.: 16/201,668

(22) Filed: Nov. 27, 2018

(65) Prior Publication Data
US 2020/0164864 A1  May 28, 2020

(51) Int. Cl.
| | | |
|---|---|---|
| *B60W 20/20* | (2016.01) | |
| *B60K 6/442* | (2007.10) | |
| *B60W 10/06* | (2006.01) | |
| *B60W 10/08* | (2006.01) | |
| *B60K 6/387* | (2007.10) | |
| *B60K 6/36* | (2007.10) | |
| *B60W 10/02* | (2006.01) | |
| *B60K 6/28* | (2007.10) | |

(52) U.S. Cl.
CPC .............. *B60W 20/20* (2013.01); *B60K 6/28* (2013.01); *B60K 6/36* (2013.01); *B60K 6/387* (2013.01); *B60K 6/442* (2013.01); *B60W 10/02* (2013.01); *B60W 10/06* (2013.01); *B60W 10/08* (2013.01); *B60W 2710/021* (2013.01); *B60W 2710/0644* (2013.01); *B60W 2710/0666* (2013.01); *B60W 2710/082* (2013.01); *B60W 2710/086* (2013.01); *B60Y 2200/92* (2013.01)

(58) Field of Classification Search
CPC .................................................... B60W 20/20
See application file for complete search history.

(56) References Cited

U.S. PATENT DOCUMENTS

| | | | |
|---|---|---|---|
| 6,984,946 B2 * | 1/2006 | Donnelly | B60L 3/102 318/139 |
| 8,647,231 B2 | 2/2014 | Soliman et al. | |
| 9,327,704 B2 | 5/2016 | Kim et al. | |
| 9,327,717 B2 * | 5/2016 | Reed | B60L 58/12 |
| 9,568,080 B2 | 2/2017 | Yang et al. | |
| 9,849,869 B2 * | 12/2017 | Frank | B60K 6/442 |
| 2008/0119320 A1 | 5/2008 | Wu et al. | |
| 2015/0266461 A1 * | 9/2015 | Sahashi | B60W 20/10 477/5 |
| 2017/0259810 A1 * | 9/2017 | Zhang | B60W 10/08 |
| 2018/0201116 A1 * | 7/2018 | Miyagawa | B60W 20/13 |
| 2020/0122712 A1 * | 4/2020 | Miki | B60W 10/04 |

FOREIGN PATENT DOCUMENTS

| | | |
|---|---|---|
| JP | 2012240551 A * | 12/2012 |
| WO | 2005096492 A1 | 10/2005 |
| WO | 2017186133 A1 | 11/2017 |

* cited by examiner

*Primary Examiner* — Alex C Dunn
(74) *Attorney, Agent, or Firm* — David Kelley; McCoy Russell LLP

(57) ABSTRACT

Systems and methods changing between driveline operating modes of a hybrid vehicle are described. In one example, electrical output to electric power consumers is maintained during closing of a driveline disconnect clutch. Further, engine speed is controlled via a first electric machine to a speed of a second electric machine to provide smooth closing of a driveline disconnect clutch.

16 Claims, 6 Drawing Sheets

METHODS AND SYSTEM FOR SWITCHING DRIVELINE OPERATING MODES

FIELD

The present description relates to methods and a system for changing between series and parallel hybrid driveline operating modes.

BACKGROUND AND SUMMARY

A hybrid vehicle driveline may be operated in a series mode or in a parallel mode. The hybrid vehicle driveline may include an internal combustion engine that supplies mechanical power to a first electric machine, and the first electric machine may supply electrical power to a second electrical machine that propels the vehicle when the hybrid vehicle is operating in a series mode. The engine and the first electric machine are decoupled from the vehicle's wheels and the second electric machine is coupled to the vehicle's wheels when the vehicle operates in the series driveline mode. The series driveline mode may be a desirable operating mode when driver demands are relatively low because the engine may be operated at efficient steady state operating conditions while operating conditions of the second electric machine change with driver demand torque and vehicle operating conditions. If driver demand torque or power is increased to a higher level, the hybrid vehicle driveline may change from series operation to parallel operation. The internal combustion engine and the second electric machine may provide mechanical power to the hybrid vehicle driveline when the hybrid vehicle is operating in parallel mode. Alternatively, only the internal combustion engine may provide torque to propel the hybrid vehicle when the hybrid vehicle is operating in parallel mode. However, if the hybrid vehicle includes a driveline disconnect clutch that is positioned between the internal combustion engine and the second electric machine, the output of the internal combustion engine may be reduced such that output of the first electric machine is reduced when there is a request to transition the hybrid driveline from series operation to parallel operation. But, reducing output of the internal combustion engine may reduce delivery of power to external electrical loads that may be coupled to the vehicle. Consequently, operation of the external electrical loads may be compromised during a mode change from series mode to parallel mode.

The inventors herein have recognized the above-mentioned issues and have developed a driveline method, comprising: requesting a change from a series driveline mode to a parallel driveline mode via a controller; operating an engine in a speed control mode and a first electric machine in an electric power output control mode responsive to the request; and adjusting a speed of the first electric machine to a speed of a second electric machine while the second electric machine is propelling a vehicle responsive to the request.

By operating the internal combustion engine in a speed control mode while a first electric machine is operating in an electric power output control mode, it may be possible to provide the technical result of continuously and without interruption maintaining an amount of electrical power supplied to external power consumers via the first electric machine while changing from operating in a series hybrid vehicle mode to operating in a parallel hybrid vehicle operating mode. Further, the vehicle may continue to follow driver demand torque via torque that is supplied by a second electric machine to propel the vehicle. The first electric machine and the engine may be accelerated to a speed of the second electric machine before closing the driveline disconnect clutch and entering parallel mode. The first electric machine may be accelerated to the speed of the second electric machine without significantly changing the electrical power output of the first electric machine. Once the driveline disconnect clutch is closed, the engine and the second electric machine may provide power to propel the vehicle. Alternatively, the only the engine may provide power to propel the vehicle and the second electric machine may be deactivated or it may supply power to an electric energy storage device.

The present description may provide several advantages. In particular, the approach may reduce the possibility of driveline torque disturbance when a hybrid driveline is changed from a series mode to a parallel mode. Further, the approach allows electrical power to be continuously supplied to external power consumers during a driveline mode change. Further still, the approach may reduce the possibility of driveline degradation.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 2:
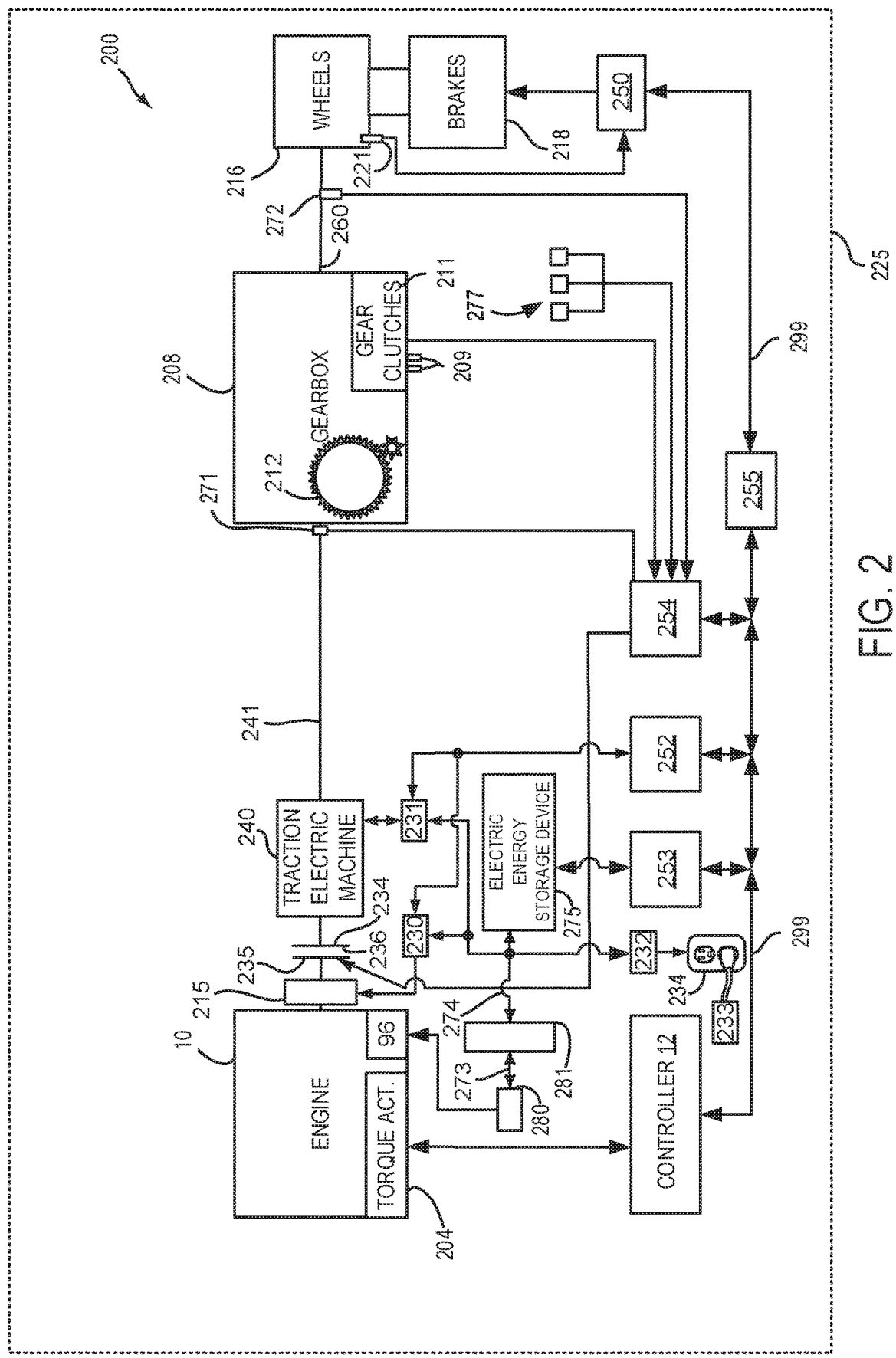
FIG. 2 is a schematic diagram of a hybrid vehicle driveline.
Figure 3:
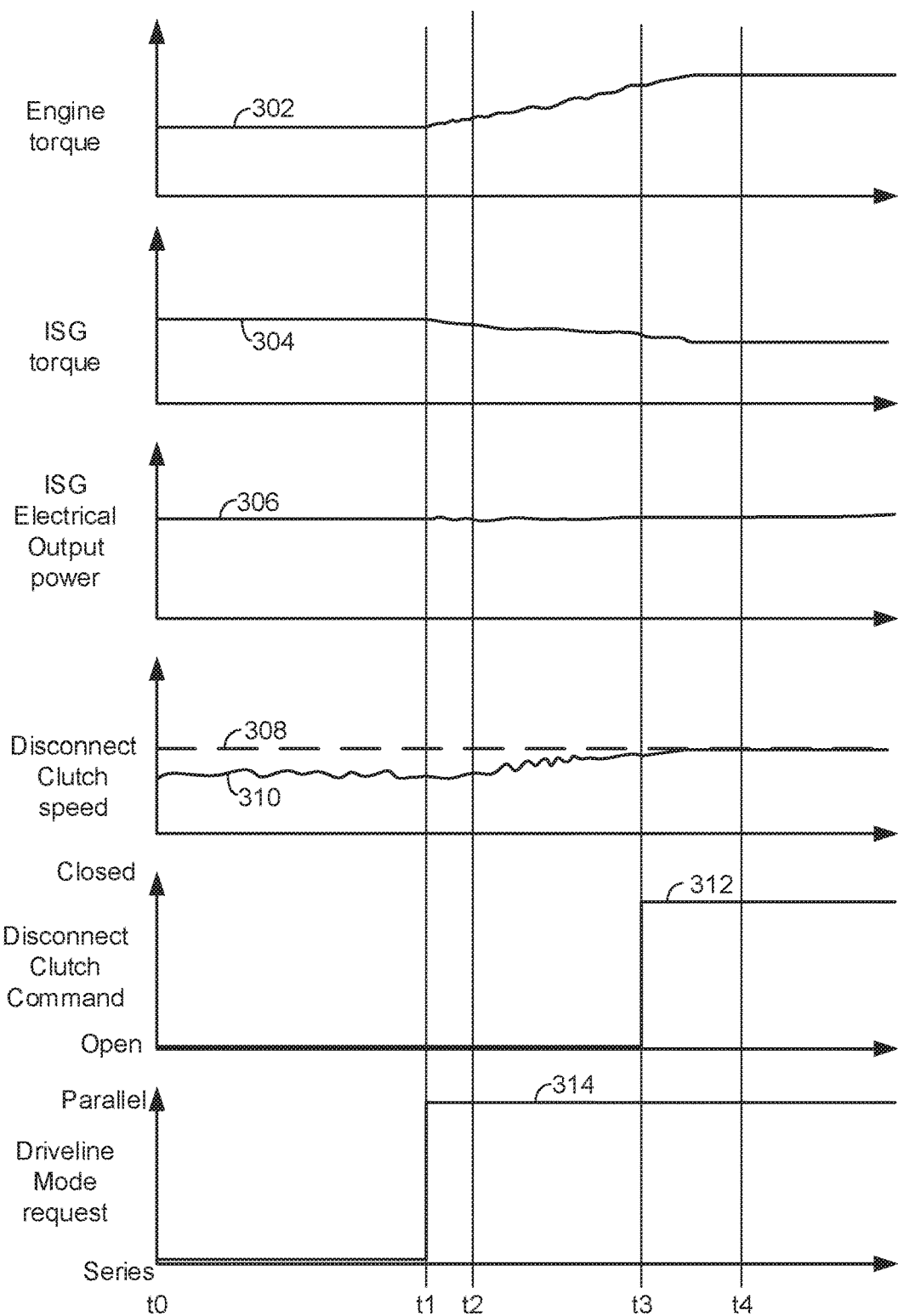
FIG. 3 shows an example driveline operating sequence according to the method of FIGS. 4 and 5.

The present description is related to operating a hybrid vehicle and changing driveline operating modes of the hybrid vehicle. The hybrid vehicle may include an engine of the type shown in FIG. 1. The engine may be part of a driveline that includes an integrated starter/generator (ISG) and a traction electric machine as shown in FIG. 2. The driveline may be operated in a series mode where only the traction electric machine directly provides mechanical power to propel a vehicle, or the driveline may be operated in a parallel mode where the engine or the engine and the traction electric machine provide mechanical power to propel the vehicle. The driveline may transition from series mode to parallel mode as shown in FIG. 3 according to the method of FIGS. 4 and 5. The transition from operating the driveline in series mode to operating in parallel mode may include closing a driveline disconnect clutch as described in the method of FIGS. 4 and 5. Engine speed may transition to traction motor speed during the driveline mode change according to the functions shown in FIGS. 6A-6C.

Figure 1:
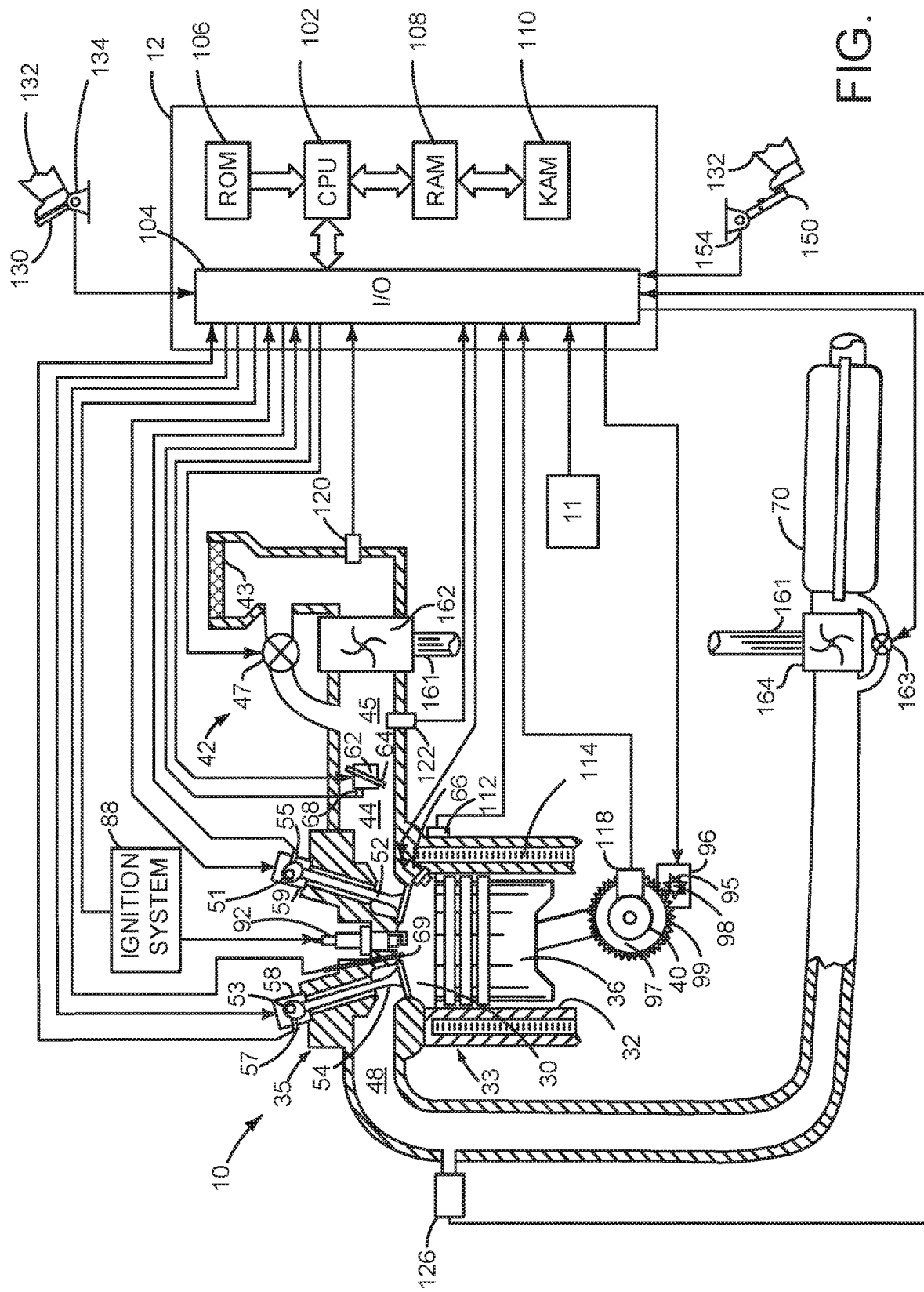
FIG. 1 is a schematic diagram of an engine.

Referring to FIG. 1, internal combustion engine 10, comprising one or more cylinders, one cylinder of which is shown in FIG. 1, is controlled by electronic engine controller 12. The controller 12 receives signals from the various sensors shown in FIGS. 1 and 2. Controller 12 employs the actuators shown in FIGS. 1 and 2 to adjust engine operation based on the received signals and instructions stored in memory of controller 12.

Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Optional starter 96 (e.g., low voltage (operated with less than 30 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft.

Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. Valve activation devices 58 and 59 may be electromechanical devices. Pressure in combustion chamber 30 may be sensed via cylinder pressure sensor 69.

Fuel injector 66 is shown positioned to inject fuel directly into cylinder 30, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Wastegate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by human driver 132; a position sensor 154 coupled to brake pedal 150 for sensing force applied by human driver 132, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

Controller 12 may also receive input from human/machine interface 11. A request to start or stop the engine or vehicle may be generated via a human and input to the human/machine interface 11. Further, the vehicle may be activated (e.g., systems are activated and prepared to supply energy to vehicle propulsion sources such as internal combustion engines and electric machines) via human/machine interface 11. Activating the vehicle may include increasing pressure of fuel supplied to an engine and supplying electrical power to an inverter. The human/machine interface may be a touch screen display, pushbutton, key switch or other known device.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a powertrain or driveline 200. The powertrain of FIG. 2 includes engine 10 shown in FIG. 1. Powertrain 200 is shown including vehicle system controller 255, engine controller 12, electric machine controller 252, transmission controller 254, energy storage device controller 253, and brake controller 250. The controllers may communicate over controller area network (CAN) 299. Each of the controllers may provide information to other controllers such as torque output limits (e.g., torque output of the device or component being controlled not to be exceeded), torque input limits (e.g., torque input of the device or component being controlled not to be exceeded), torque output of the device being controlled, sensor and actuator data, diagnostic information (e.g., information regarding a degraded transmission, information regarding a degraded engine, information regarding a degraded electric machine, information regarding degraded brakes). Further, the vehicle system controller 255 may provide commands to engine controller 12, electric machine controller 252, transmission controller 254, and brake controller 250 to achieve driver input requests and other requests that are based on vehicle operating conditions.

For example, in response to a driver releasing an accelerator pedal and vehicle speed, vehicle system controller 255 may request a desired wheel torque or a wheel power level to provide a desired rate of vehicle deceleration. The desired wheel torque may be provided by vehicle system controller 255 requesting a first braking torque from electric machine controller 252 and a second braking torque from brake controller 250, the first and second torques providing the desired braking torque at vehicle wheels 216.

In other examples, the partitioning of powertrain controlling devices may be different than that shown in FIG. 2. For example, a single controller may take the place of vehicle system controller 255, engine controller 12, electric machine controller 252, transmission controller 254, and brake controller 250. Alternatively, the vehicle system controller 255 and the engine controller 12 may be a single unit while the electric machine controller 252, the transmission controller 254, and the brake controller 250 are standalone controllers.

In this example, powertrain 200 may be powered by engine 10, integrated starter/generator (ISG) 215, and traction electric machine 240. In other examples, engine 10 may be omitted. Engine 10 may be started with an engine starting system shown in FIG. 1 or via driveline integrated starter/generator (ISG) 215 also known as an integrated starter/generator. Driveline ISG 215 (e.g., high voltage (operated with greater than 30 volts) electrical machine) may also be referred to as an electric machine, motor, and/or generator. Further, torque of engine 10 may be adjusted via torque actuator 204, such as a fuel injector, throttle, etc. Traction electric machine 240 may solely provide propulsive power to driveline 200 or traction electric machine 240 may supply propulsive power to driveline 200 in combination with engine 10 or with engine 10 and ISG 215.

Bi-directional DC/DC converter 281 may transfer electrical energy from a high voltage bus 274 to a low voltage bus 273 or vice-versa. Low voltage battery 280 is electrically coupled to low voltage bus 273. Low voltage battery 280 selectively supplies electrical energy to starter motor 96. Electric energy storage device 275 is electrically coupled to high voltage bus 274. First inverter 230 and second inverter 231 are also electrically coupled to high voltage bus 274. First inverter 230 and second inverter 231 may convert direct current (DC) electric power from electric energy storage device 275 into alternating current (AC) power when ISG 215 and traction electric machine 240 are operated as motors. First inverter 230 and second inverter 231 may convert AC electric power from ISG 215 and traction electric machine 240 into DC power to charge electric energy storage device 275 when ISG 215 and traction electric machine 240 are operated as generators. Shaft 241 mechanically couples traction electric machine 240 to gearbox 208.

An engine output torque may be transmitted to an input or first side of powertrain disconnect clutch 235 through ISG 215. In some examples, the input side of the disconnect clutch 235 may be a flywheel that is mechanically coupled to ISG 215. Disconnect clutch 236 may be electrically or hydraulically actuated. The output or second side 234 of disconnect clutch 236 is shown directly mechanically coupled to traction electric machine 240.

ISG 215 and traction electric machine 240 may be operated to provide torque to powertrain 200 or to convert powertrain torque into electrical energy to be stored in electric energy storage device 275 in a regeneration mode. ISG 215 is in electrical communication with first inverter 230 and first inverter 230 is in electrical communication with energy storage device 275. ISG 215 has a higher output torque capacity than starter 96 shown in FIG. 1. Traction electric machine 240 is in electrical communication with second inverter 231 and second inverter 231 is in electrical communication with energy storage device 275. Traction electric machine 240 has a higher output torque capacity than ISG 215. Further, traction electric machine 240 directly drives powertrain 200 or is directly driven by powertrain 200. There are no belts, gears, or chains to couple traction electric machine 240 to powertrain 200. Rather, traction electric machine 240 rotates at the same rate as powertrain 200. Electrical energy storage device 275 (e.g., high voltage battery or power source) may be a battery, capacitor, or inductor. Traction electric machine 240 may provide a positive torque or a negative torque to powertrain 200 via operating as a motor or generator as instructed by electric machine controller 252.

Gearbox 208 includes gear clutches (e.g., gears 1-2) 211 and gears 212. In one example, gearbox 208 may selectively engage one of two fixed ratio gear sets. The gear clutches 211 may be selectively engaged to change a ratio of an actual total number of turns of input shaft 241 to an actual total number of turns of wheels 216. Gear clutches 211 may be engaged or disengaged via adjusting fluid supplied to the clutches via shift control solenoid valves 209. Torque output from the gearbox 208 may also be relayed to wheels 216 to propel the vehicle via output shaft 260. Specifically, gearbox 208 may transfer an input driving torque at the input shaft 241 responsive to a vehicle traveling condition before transmitting an output driving torque to the wheels 216. Transmission controller 254 selectively activates or engages gear clutches 211. Transmission controller also selectively deactivates or disengages gear clutches 211.

A frictional force may be applied to wheels 216 by engaging friction wheel brakes 218. In one example, friction wheel brakes 218 may be engaged in response to the driver pressing his foot on a brake pedal (not shown) and/or in response to instructions within brake controller 250. Further, brake controller 250 may apply brakes 218 in response to information and/or requests made by vehicle system controller 255. In the same way, a frictional force may be reduced to wheels 216 by disengaging wheel brakes 218 in response to the driver releasing his/her foot from a brake pedal, brake controller instructions, and/or vehicle system controller instructions and/or information. For example, vehicle brakes may apply a frictional force to wheels 216 via controller 250 as part of an automated engine stopping procedure.

In response to a request to accelerate vehicle 225, vehicle system controller may obtain a driver demand torque request from an accelerator pedal or other device. Alternatively, the vehicle system controller may obtain a driver demand power request from the accelerator pedal or other device. Vehicle system controller 255 may then allocate a fraction of the requested driver demand torque or power to the traction electric machine 240 and the remaining fraction to the engine and the ISG when the driveline is operating in parallel mode. Vehicle system controller 255 may allocate all the requested driver demand torque or power to the traction electric machine 240 when the driveline is operating in series mode. Vehicle system controller 255 requests the engine torque or power from engine controller 12 and the ISG torque or power and traction electric machine torque or power from electric machine controller 252. In some conditions when it may be desired to charge electric energy storage device 275, a charging torque (e.g., a negative ISG torque and/or a negative traction electric machine torque) or power may be requested while a non-zero driver demand torque or power is present. Vehicle system controller 255 may request increased engine torque to overcome the charging torque to meet the driver demand torque.

In response to a request to decelerate vehicle 225 and provide regenerative braking, vehicle system controller may provide a negative desired wheel torque or power based on vehicle speed and brake pedal position. Vehicle system controller 255 may then allocate a fraction of the negative desired wheel torque or power to the ISG 215, a fraction of the negative desired torque or power to traction electric machine 240 (e.g., desired powertrain wheel torque), and the remaining fraction of torque or power to friction brakes 218 (e.g., desired friction brake wheel torque). Further, vehicle system controller may notify transmission controller 254 that the vehicle is in regenerative braking mode so that transmission controller 254 shifts gears 211 based on a unique shifting schedule to increase regeneration efficiency. ISG 215 and/or traction electric machine 230 may supply a negative torque or power to transmission input shaft 270, but negative torque or power provided by ISG 215 and traction electric machine 240 may be limited by transmission controller 254 which outputs a transmission input shaft negative torque limit (e.g., not to be exceeded threshold value). Further, negative torque or power of ISG 215 and traction electric machine 240 may be limited (e.g., constrained to less than a threshold negative threshold torque) based on operating conditions of electric energy storage device 275, by vehicle system controller 255, or electric machine controller 252. Any portion of desired negative wheel torque that may not be provided by ISG 215 and/or the traction electric machine 240 because of transmission or ISG limits may be allocated to friction brakes 218 so that the desired wheel torque is provided by a combination of negative wheel torque from friction brakes 218, traction electric machine 240, and ISG 215.

Accordingly, torque control of the various powertrain components may be supervised by vehicle system controller 255 with local torque control for the engine 10, transmission 208, electric machine 240, and brakes 218 provided via engine controller 12, electric machine controller 252, transmission controller 254, and brake controller 250.

As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output.

Electric machine controller 252 may control torque output and electrical energy production from ISG 215 and traction electric machine 240 by adjusting current flowing to and from field and/or armature windings of ISG 215 and traction electric machine 240 via first inverter 230 and second inverter 231. First inverter 230 may be operated and commanded independently from second inverter 231. Third inverter 232 is shown electrically coupled to high voltage bus 274 and it may convert DC power from electric energy storage device, output from first inverter 230, and/or output from second inverter 231 to AC power that may be supplied to external electric power consumers 233 via electric receptacle 234. External electric power consumers 233 are not part of vehicle 225 and they may include but are not limited to power tools, audio systems, fans, motors, lights, and communications equipment.

Transmission controller 254 receives transmission input shaft position via position sensor 271. Transmission controller 254 may convert transmission input shaft position into input shaft speed via differentiating a signal from position sensor 271 or counting a number of known angular distance pulses over a predetermined time interval. Transmission controller 254 may receive transmission output shaft torque from torque sensor 272. Alternatively, sensor 272 may be a position sensor or torque and position sensors. If sensor 272 is a position sensor, controller 254 may count shaft position pulses over a predetermined time interval to determine transmission output shaft velocity. Transmission controller 254 may also differentiate transmission output shaft velocity to determine transmission output shaft acceleration. Transmission controller 254, engine controller 12, and vehicle system controller 255, may also receive addition transmission information from sensors 277, which may include but are not limited to pump output line pressure sensors, transmission hydraulic pressure sensors (e.g., gear clutch fluid pressure sensors), ISG temperature sensors, and traction electric machine temperatures, and ambient temperature sensors.

Brake controller 250 receives wheel speed information via wheel speed sensor 221 and braking requests from vehicle system controller 255. Brake controller 250 may also receive brake pedal position information from brake pedal sensor 154 shown in FIG. 1 directly or over CAN 299. Brake controller 250 may provide braking responsive to a wheel torque command from vehicle system controller 255. Brake controller 250 may also provide anti-lock and vehicle stability braking to improve vehicle braking and stability. As such, brake controller 250 may provide a wheel torque limit (e.g., a threshold negative wheel torque not to be exceeded) to the vehicle system controller 255 so that negative ISG torque does not cause the wheel torque limit to be exceeded. For example, if controller 250 issues a negative wheel torque limit of 50 N-m, traction electric machine torque is adjusted to provide less than 50 N-m (e.g., 49 N-m) of negative torque at the wheels, including torque amount changes produced via transmission gearing.

Thus, the system of FIGS. 1 and 2 provides for a system, comprising: an engine; a driveline disconnect clutch; a first electric machine directly coupled to the engine when the driveline disconnect clutch is fully open; a second electric machine coupled to the driveline disconnect clutch and a gearbox when the driveline disconnect clutch is fully open; and a controller including executable instructions stored in non-transitory memory to request change from operating a driveline in a series mode to operating the driveline in a parallel mode, and instructions to operate the engine in a speed control mode and the first electric machine in an electric power control mode in response to the request to change from operating the driveline in the series mode to operating the driveline in the parallel mode. The system further comprises additional instructions to adjust a rate of change of speed of the first electric machine from a first speed to a second speed. The system includes where the second speed is a speed of the second electric machine.

In some examples, the system further comprises additional instructions to fully close the driveline disconnect clutch in response to a speed of the first electric machine being within a threshold speed of a speed of the second electric machine. The system further comprises additional instructions to command the engine to a power that is a base engine power plus an additive torque when an electric energy storage device lacks capacity to store electric power generated by the first electric machine. The system further comprises additional instructions to maintain electric power supplied via the first electric machine to electric power consumers in response to the requested change.

Figure 4:
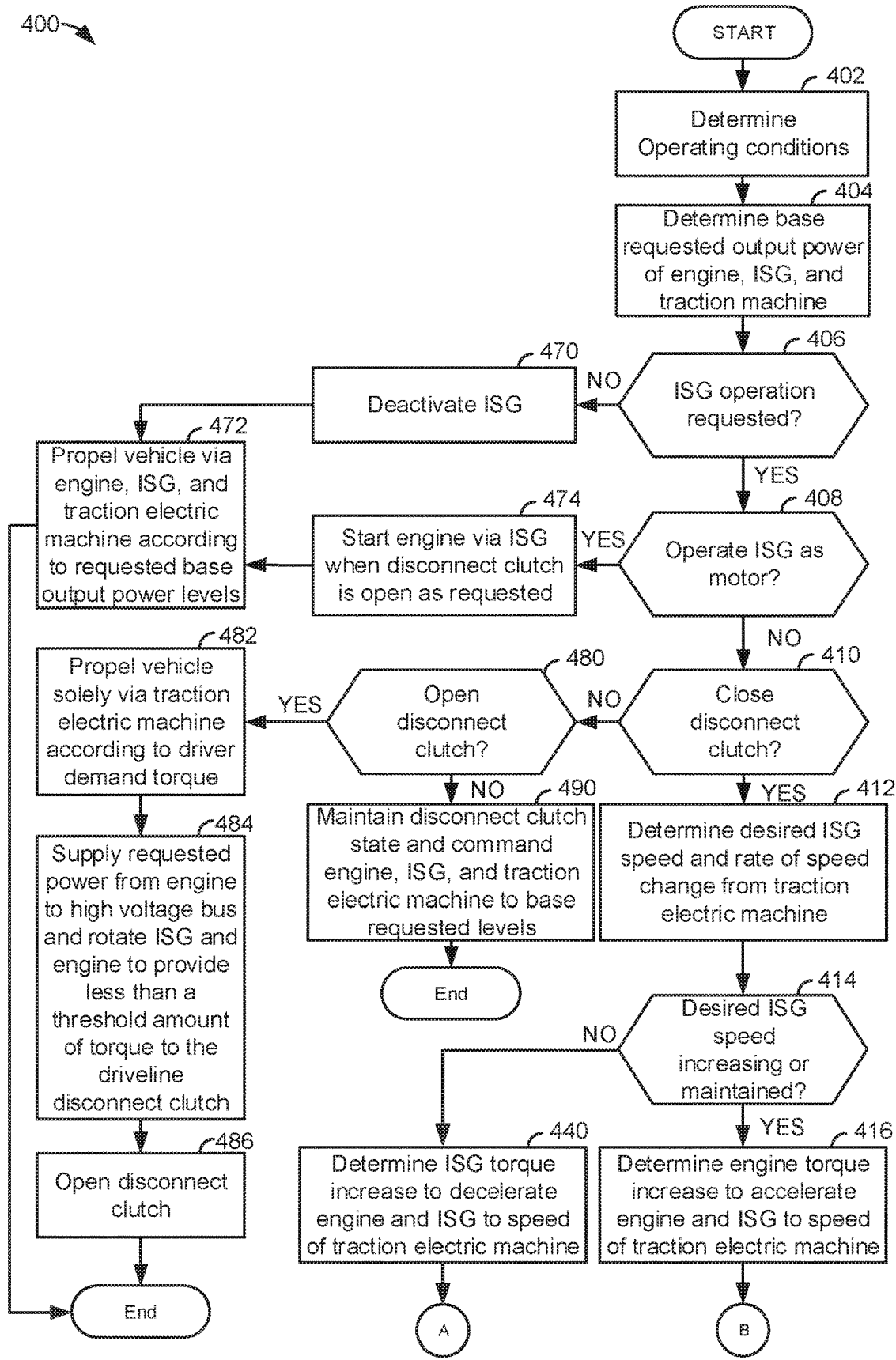
FIGS. 4 and 5 shows a flow chart of a driveline operating sequence.
Figure 5:
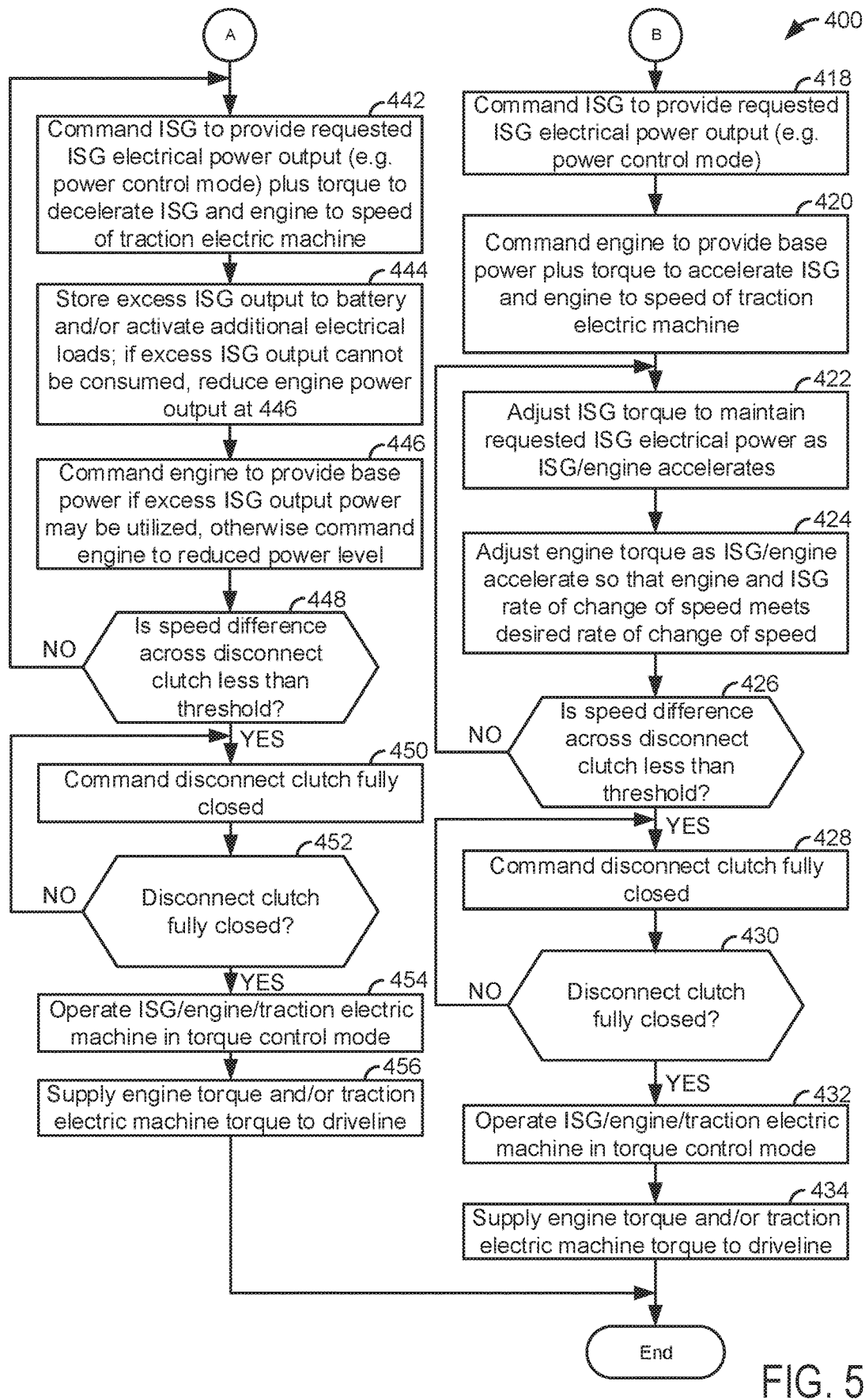

Referring now to FIG. 3, a vehicle operating sequence according to the method of FIGS. 4 and 5 is shown. The five plots are time aligned and they occur at a same time. The vertical lines at times t0-t4 represents times of interest in the sequence. The sequence of FIG. 3 may be provided via the system of FIGS. 1 and 2 in cooperation with the method of FIGS. 4 and 5.

The first plot from the top of FIG. 3 is a plot of engine torque versus time. The vertical axis represents engine torque and engine torque increases in the direction of the vertical axis arrow. The horizontal axis of the first plot represents time and time increases from the left side of the figure to the right side of the figure. Trace 302 represents a commanded engine torque.

The second plot from the top of FIG. 3 is a plot of ISG torque (e.g., torque applied to the engine of FIG. 2) versus time. The vertical axis represents the ISG torque and the ISG torque increases in the direction of the vertical axis arrow. The horizontal axis represents time and time increases from the left side of the figure to the right side of the figure. Trace 304 represents ISG torque.

The third plot from the top of FIG. 3 is a plot of ISG electrical power output versus time. The vertical axis represents the ISG electric power output and ISG electric output power increases in the direction of the vertical axis arrow. The horizontal axis represents time and time increases from the left side of the figure to the right side of the figure. Trace 306 represents ISG electric power output.

The fourth plot from the top of FIG. 3 is a plot of driveline disconnect clutch rotational speed versus time. The vertical axis represents the driveline disconnect clutch rotational speed and the driveline disconnect clutch speed increases in the direction of the vertical axis arrow. The horizontal axis represents time and time increases from the left side of the figure to the right side of the figure. Trace 310 represents a driveline disconnect clutch input side speed. Trace 308 represents the driveline disconnect clutch output side speed.

The fifth plot from the top of FIG. 3 is a plot of driveline disconnect clutch command versus time. The vertical axis represents the driveline disconnect clutch command and the driveline disconnect clutch is commanded fully closed when trace 314 is near the vertical axis arrow. The driveline disconnect clutch is commanded fully open when trace 314 is near the horizontal axis. The horizontal axis represents time and time increases from the left side of the figure to the right side of the figure. Trace 312 represents the driveline disconnect clutch command.

The sixth plot from the top of FIG. 3 is a plot of driveline operating mode request versus time. The vertical axis represents the driveline operating mode request and the driveline operating mode request is for a parallel driveline mode when trace 316 is near the vertical axis arrow. The driveline operating mode request is for a series driveline mode when trace 316 is near the horizontal axis. The horizontal axis represents time and time increases from the left side of the figure to the right side of the figure. Trace 314 represents the driveline operating mode request.

At time t0, the engine torque command is at a middle level and the ISG torque is a higher middle level. The ISG is supplying electric power to the traction electric machine and external electric power consumers (not shown). The ISG electrical output power is at a higher level and rotational speed on the input side of the driveline disconnect clutch (e.g., rotational speed on the ISG side of the disconnect clutch) is less than rotational speed on the output side of the driveline disconnect clutch (e.g., traction electric machine side of the disconnect clutch). The driveline disconnect clutch is commanded fully open and the driveline mode request is indicating that series driveline mode is requested (e.g., where the traction electric machine solely supplies torque to propel the vehicle and where the engine and ISG are decoupled from the wheels via a disconnect clutch such that the engine may provide mechanical power to the ISG so that the ISG may supply electric power to the traction electric machine).

At time t1, a request is generated via the controller to change the driveline from series mode to parallel mode. The request may be made in response to an increase in driver demand torque, low electric energy storage device SOC, or other vehicle operating condition. The engine enters a speed control mode (e.g., where engine speed is adjusted to supply a desired engine speed and where engine torque may be varied to provide the desired engine speed) and the ISG enters an electric power control mode (e.g., a mode where ISG electric power output provides a desired amount of electrical power and ISG torque applied to the engine and ISG speed are allowed to vary (increase/decrease) as ISG electric power output meets the desired ISG electric power). By operating the engine in a speed control mode, the engine/ISG speed may be adjusted to the speed of the traction electric machine while the ISG provides the desired ISG electric power output. Further, while operating the engine in the speed control mode, the engine may supply the desired amount of torque so that the ISG provides the desired electric output. Because the ISG rotational speed (speed on the input side of the driveline disconnect clutch) is less than the traction electric machine rotational speed (speed on the output side of the driveline disconnect clutch), the engine torque command begins to increase and the ISG torque is decreased as ISG field current is adjusted to maintain the ISG electric output at the desired level. In this example, the desired ISG electric output is constant (not shown) and the ISG electric output meets this constant level. Speed on the input side of the driveline disconnect clutch begins to increase toward speed on the output side of the driveline disconnect clutch. The desired rate of engine/ISG speed change may also be determined at time t1 and the desired engine/ISG speed may be determined at time t1. The driveline disconnect clutch remains commanded fully open.

At time t2, the engine/ISG speed begins to change so that the speed of the input side of the driveline disconnect clutch begins to increase. The engine torque continues to increase and the ISG torque is decreased as the engine/ISG speed increases to maintain the ISG electric output power at the desired level. However, if the amount of electric power consumed by external electric power consumers increases or decreases, then the engine output power may be adjusted accordingly to provide an adjusted torque amount to the ISG so that the ISG may provide the change in power consumed by the external electric power consumers. The driveline disconnect clutch remains commanded fully open. The request to enter parallel driveline mode remains asserted.

Between time t2 and time t3, the commanded engine speed continues to increase and the engine torque is increased to increase the engine/ISG speed. The ISG torque decreases as engine/ISG speed increases and the ISG electric output remains constant. The rotational speed of the input side of the driveline disconnect clutch continues to approach the rotational speed of the output side of the driveline disconnect clutch. The driveline disconnect clutch remains commanded fully open and the parallel driveline mode continues to be requested.

At time t3, rotational speed on the input side of the driveline disconnect clutch is within a threshold speed of the rotational speed on the output side of the driveline disconnect clutch. Therefore, the driveline disconnect clutch is commanded fully closed. Because rotational speed on the input side of the driveline disconnect clutch is within a threshold speed of the rotational speed on the output side of the driveline disconnect clutch, a very small amount of torque may be transferred across the driveline disconnect clutch so that the possibility of driveline torque disturbances may be reduced. The commanded engine torque continues to increase and the actual engine torque follows the commanded engine torque. The commanded ISG torque continues to decrease as the engine/ISG speed continues to increase so that ISG electric output may be maintained at the desired level. The driveline mode request continues to assert parallel mode.

At time t4, the driveline disconnect clutch fully closes and the commanded engine torque and the ISG torque level off. The ISG electric output power continues to meet the desired ISG electric output power. Speed on the input side of the driveline disconnect clutch matches speed on the output side of the driveline disconnect clutch. The driveline disconnect clutch is fully closed and the driveline disconnect clutch remains commanded fully closed and the parallel driveline mode remains requested.

In this way, it may be possible to maintain ISG electrical power that is generated from engine power during a mode change from a series driveline mode to a parallel driveline mode. Further, a rotational speed of the engine may be adjusted to a rotational speed of a traction electric machine so that the driveline mode change may be performed in a timely manner.

Referring now to FIGS. 4 and 5, a flow chart of a method for operating a vehicle driveline is shown. The method of FIGS. 4 and 5 may be incorporated into and may cooperate with the system of FIGS. 1 and 2. Further, at least portions of the method of FIGS. 4 and 5 may be incorporated as executable instructions stored in non-transitory memory while other portions of the method may be performed via a controller transforming operating states of devices and actuators in the physical world. The method of FIGS. 4 and 5 may be executing when a vehicle is traveling on a road after the vehicle has been activated.

At 402, method 400 determines operation conditions. Operating conditions may include but are not limited to driver demand torque, ISG torque, traction electric machine torque, external electric consumer power consumption, engine operating state, ISG rotational speed, traction machine rotational speed, engine torque, and engine rotational speed. Method 400 proceeds to 404.

At 404, method 400 determines values for requested base internal combustion engine output power ($E_{base\_pow\_m}$), base ISG mechanical power output/input ($ISG_{base\_pow\_m}$), and base traction electric machine mechanical power output/input ($T_{base\_pow\_m}$). The values of requested base internal combustion engine output power ($E_{base\_pow\_m}$), base ISG mechanical power output/input ($ISG_{base\_pow\_m}$), and base traction electric machine mechanical power output/input ($T_{base\_pow\_m}$) may be dependent on the engaged or activated driveline operating mode (e.g., series or parallel modes). In one example, accelerator pedal position and vehicle speed are input to one or more tables and/or functions and the tables and/or functions output a base driver demand power to be delivered to vehicle wheels. The base driver demand power may be partitioned into base engine power output that is to be delivered to vehicle wheels and base traction electric machine mechanical power output/input to be delivered to vehicle wheels. For example, if the driveline is operating in parallel mode, the base driver demand may be expressed as:

$$DD_{base\_pow} = E_{base\_pow\_m} + T_{base\_pow\_m}$$

where $DD_{base\_pow}$ is the base driver demand power, $E_{base\_pow\_m}$ is the base engine output power to be delivered to vehicle wheels, and $T_{base\_pow\_m}$ is the base traction electric machine output power to be delivered to vehicle wheels. The values of $E_{base\_pow\_m}$ and $T_{base\_pow\_m}$ need not be equivalent. If the driveline is operating in series mode, the base driver demand power may be expressed as:

$$DD_{base\_pow} = T_{base\_pow\_m}$$

since the driver demand power is an amount of power that is delivered to the vehicle's wheels to propel the vehicle. The base engine power output and base traction electric machine mechanical power output/input values may also be adjusted for other vehicle operating conditions including but not limited to battery state of charge (SOC), battery temperature, barometric pressure, ambient temperature, and temperatures of the traction electric machine and the engine.

Method 400 may also determine a requested base ISG electric power amount output ($ISG_{base\_pow\_elec}$). The base ISG electric power output may be a sum of electric power for the traction electric machine to provide the requested base traction electric machine mechanical power output (Tbase_pow_e) plus electric power to requested via external electric power consumers (Exbase_pow_e) plus electric power requested for charging batteries or electric power storage devices and powering onboard electric power consuming accessories (Batbase_pow_e). The requested base ISG electric power amount is a negative value since generating electric power consumes torque from the driveline. The electric power requested for charging batteries may be a function SOC and an amount of charge being drawn from the batteries. The electric power requested for external electric power consumers may be determined via sensing an amount of current and voltage supplied to external electric power consumers. Method 400 proceeds to 406.

At 406, method 400 judges whether or not ISG operation is requested. In one example, operation of the ISG may be requested when the base ISG electric power value is not zero or when the base ISG mechanical input/output power is not zero. If ISG operation is requested, the answer is yes and method 400 proceeds to 408. Otherwise, the answer is no and method 400 proceeds to 470.

At 470, method 400 deactivates the ISG. The ISG may be deactivated via ceasing to supply electrical power to the ISG. In one example, switches or transistors within an inverter cease switching to deactivate the ISG. Method 400 proceeds to 472.

At 472, method 400 may operate the engine, ISG, and traction electric machine to propel the vehicle. However, if the driveline disconnect clutch is open and the ISG is deactivated due to zero ISG being requested at 404, then the traction electric machine may be the sole source propelling the vehicle. The traction electric machine may receive power via a battery or electric energy storage device. For example, if driver demand power is 20 kilowatts (kW), all 20 kW are requested via the requesting base traction electric machine mechanical output of 20 kW. The engine may stop rotating when the ISG is deactivated.

On the other hand, if the ISG is operating as a motor generating mechanical power and the driveline disconnect clutch is fully closed, the ISG may provide at least some of the driver demand power. Further, the engine and the traction electric machine may provide the remainder of the requested driver demand power. For example, if driver demand power is 25 kilowatts (kW), the base ISG mechanical input/output may be 5 kW, the base traction electric machine mechanical output may be 10 kW, and the engine may provide the remaining 10 kW. Method 400 proceeds to exit.

At 408, method 400 judges if the ISG is to operate as a motor. In one example, the ISG may operate as a motor to start the internal combustion engine. Further, in some examples, the ISG may occasionally assist the engine and the traction electric machine to meet driver demand torque. Method 400 may generate a request to operate the ISG as a motor if engine starting is requested or of mechanical output of the ISG determined at 404 is non-zero. If method 400 judges a request to operate the ISG as a motor, the answer is yes and method 400 proceeds to 474. Otherwise, the answer is no and method 400 proceeds to 410.

At 474, method 400 starts the engine via the ISG and then proceeds to 472 if an engine start is requested and the driveline disconnect clutch is fully open. If the engine is already started, method 400 proceeds to 472.

At 410, method 400 judges if a request to close the driveline disconnect is present and to operate the driveline in a parallel mode. Method 400 may generate a request to closed the driveline disconnect clutch and operate the driveline in a parallel mode when driver demand torque exceeds a threshold torque, when electric energy storage state of charge (SOC) is less than a threshold, or during other vehicle operating conditions. If method 400 judges that a request to close the driveline disconnect is present and to operate the driveline in a parallel mode, then the answer is yes and method 400 proceeds to 412. Otherwise, the answer is no and method 400 proceeds to 480.

At 480, method 400 judges if a request to open the driveline disconnect is present and to operate the driveline in a series mode. Method 400 may generate a request to open the driveline disconnect clutch and operate the driveline in a series mode when driver demand torque is less than a threshold torque, when electric energy storage state of charge (SOC) is greater than a threshold, or during other vehicle operating conditions. If method 400 judges that a request to open the driveline disconnect is present and to operate the driveline in a series mode, then the answer is yes and method 400 proceeds to 482. Otherwise, the answer is no and method 400 proceeds to 490.

At 490, method 400 maintains the operating state of the driveline disconnect clutch and commands the engine to the base engine torque, commands the ISG to the base ISG electric power output, and commands the traction electric machine to the base traction electric machine mechanical power output/input determined at 404. Thus, if the driveline disconnect clutch is fully open and 20 kW of wheel torque is requested, the traction electric machine may be commanded to supply 20 kW of power to propel the vehicle and the ISG may be commanded to generate 20 kW of electric power plus a first additional amount of power for losses so that the traction electric machine may supply the requested 20 kW of power to propel the vehicle. The engine may be commanded to generate 20 kW of mechanical power plus a second additional amount of power for losses (e.g., the second amount of additional power may include the first amount of additional power plus additional power for ISG losses) so that the ISG may provide the 20 kW of electrical power plus the first amount of additional power for losses to the traction electric machine.

If the driveline disconnect clutch is closed and 20 kW of power is requested to propel the vehicle, the engine may provide the entire 20 kW of power to propel the vehicle, or the engine may provide a portion (e.g., 15 kW) of the 20 kW of power requested to propel the vehicle and the traction electric machine may provide the remaining amount of mechanical power (e.g., 5 kW via the electric energy storage device) to propel the vehicle. In another alternative, the engine may provide 5 kW of mechanical power plus additional power for losses to the ISG and the ISG may output 5 kW of electric power plus additional power for losses to the traction electric machine so that the traction electric machine provides 5 kW of mechanical power to the driveline. The engine may provide the additional 15 kW of mechanical power to the driveline. The engine may also provide additional mechanical power to the ISG so that the ISG may generate a requested amount of electrical power to supply to external electric power consumers and electric power consumers included in the vehicle (e.g., lights, navigation, audio, video, actuators). Method 400 proceeds to exit.

At 482, method 400 outputs a requested driver demand power to the vehicle driveline via the traction electric machine so that the traction electric machine solely propels the vehicle. In one example, the driver demand power is determined by referencing a table of empirically determined driver demand torque values via accelerator pedal position and vehicle speed as described at 404. The traction electric machine is commanded to the requested driver demand power. Alternatively, a wheel torque may be requested via accelerator pedal position and vehicle speed. The wheel torque may be converted into a requested driver demand torque via dividing the requested wheel torque by gear ratios in the gear box and in the final drive (e.g., axle ratio). The traction electric machine is commanded to provide the requested driver demand power. Method 400 proceeds to 484.

At 484, method 400 determines an amount of electrical power that is to be provided to the high voltage bus via the ISG and the engine. In one example, the amount of electrical power to be provided to the high voltage bus via the ISG and the engine may include an amount of power to charge an electric energy storage device, and amount of electric power to supply to external electric consumers, and an amount of electric power to supply to the traction electric machine. The engine is commanded to the amount of electric power that is to be provided to the high voltage bus via the ISG and the ISG is commanded to generate the amount of electrical power to be provided to the high voltage bus. Of course, the commanded engine power may include additional power for losses and the commanded ISG power level may include additional power for losses in the system. For example, if the amount of electric power to charge the electric energy storage device is 1000 watts, the amount of electric power to supply to external electric consumers is 2500 watts, and the amount of electric power to supply the traction motor is 7000 watts, the engine is commanded to produce 10,500 watts and the ISG is commanded to consume 10,500 watts to generate power to supply the high voltage bus. Power for losses is not included in this example. Thus, the net power provided from the engine and the ISG to the driveline disconnect clutch is within a threshold amount of power of zero power. Consequently, only a small amount of torque may be transferred from the engine and the ISG to the driveline disconnect clutch. This action may reduce the possibility of driveline torque disturbances during the mode change to series mode. Method 400 proceeds to 486.

At 486, method 400 fully opens the driveline disconnect clutch so that the ISG and the engine are decoupled from the traction electric machine. By fully opening the driveline disconnect clutch, the driveline completes entry into a driveline series operating mode. Method 400 proceeds to exit.

Figure 6A:
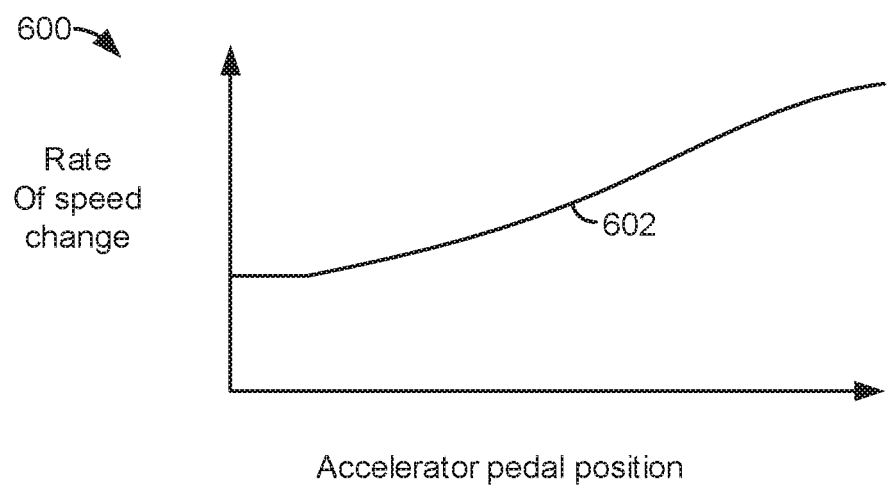
FIGS. 6A-6C show example functions for adjusting a rate of speed change of an engine during a driveline mode change from series mode to parallel mode.

At 412, method 400 determines a desired ISG and engine rotational speed and a rate of rotational speed change to reach the desired ISG and engine rotational speed from the present ISG and engine rotational speed. The desired ISG and engine rotational speed is adjusted to the present traction electric machine rotational speed. In one example, the rate of rotational speed change is determined via referencing a table or function via accelerator pedal position (e.g., as shown in FIG. 6A) and the function or table outputs a desired rate of change of rotational speed of the engine/ISG. Values in the table may be empirically determined via operating the vehicle on a chassis dynamometer and adjusting the rate of change of the rotational speed of the engine/ISG so that the driveline changes modes via closing the driveline disconnect clutch with a level of urgency that is indicated by the rate of accelerator pedal movement. This may allow the driveline to provide a desired level of performance that is adjustable with operating conditions.

Figure 6B:
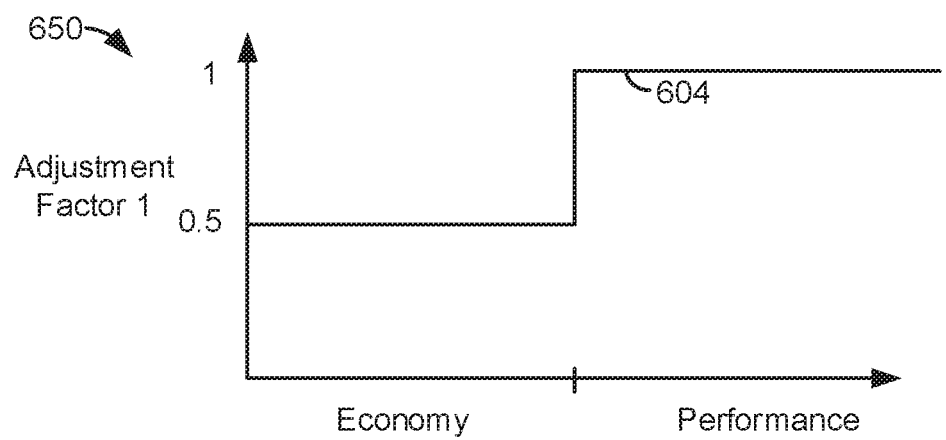
Figure 6C:
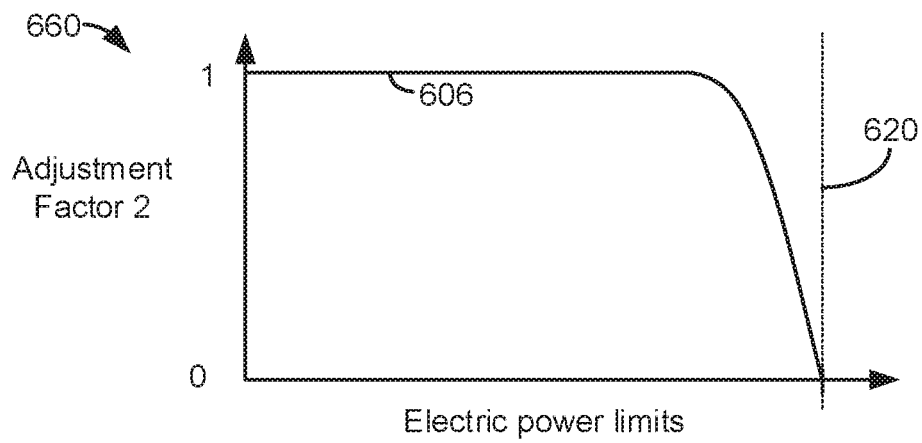

The desired rate of change in the rotational speed of the engine/ISG that is output from the table or function may then be multiplied by a first adjustment factor that is a function of the operating mode of the vehicle (e.g., performance or economy as shown in FIG. 6B). The first adjustment factor value may range from a value of zero to one and the value of the first adjustment factor may be empirically determined via operating the vehicle on the chassis dynamometer while adjusting the first adjustment factor to levels that achieve desired levels of driveline energy economy and performance. The rate of change in the rotational speed of the ISG that is output from the table and modified by the first adjustment factor may then be multiplied by a second adjustment factor that is a function of the electric power limits of the vehicle (e.g., battery discharging power limits as shown in FIG. 6C) to generate the desired rate of change in the rotational speed of the ISG. The second adjustment factor value may range from a value of zero to one and the value of the second adjustment factor may be empirically determined via operating the vehicle on the chassis dynamometer while monitoring vehicle electric power limits and adjusting the second adjustment factor to levels that achieve desired levels of electric power component protection and vehicle performance. Method 400 proceeds to 414.

At 414, method 400 judges if the desired ISG speed is increasing from the present ISG speed. If the present rotational speed of the traction electric machine is greater than the present rotational speed of the ISG, then method 400 may judge that the ISG speed is increasing or being maintained. If the present rotational speed of the traction electric machine is less than the present rotational speed of the ISG, then method 400 may judge that the ISG is decreasing. The speed of the ISG and speed of the engine are always equal since the ISG is directly and fixedly coupled to the engine. If method 400 judges that the desired ISG speed is increasing from the present ISG speed, the answer is yes and method 400 proceeds to 416. Otherwise, the answer is no and method 400 proceeds to 440.

At 416, method 400 determines an amount of engine torque to increase the rotational speed of the engine and the ISG to the speed of the traction electric machine. In one example, the amount of additional torque to increase the speed of the engine and the ISG to the speed of the traction electric machine is determined via the following equation:

$$\text{Te\_add} = j_{eng\_ISG} \cdot \dot{\omega}$$

where Te_add is the additional torque output from the engine to accelerate the engine and the ISG to the speed of the traction electric machine, $j_{eng\_ISG}$ is the combined inertia of the ISG and the engine, and $\dot{\omega}$ is the rate of speed change from the ISG and engine speed just before the request to close the driveline disconnect clutch and enter parallel driveline mode to the traction electric machine speed. Method 400 proceeds to 418.

At 418, the ISG is commanded to provide the requested base ISG electric power amount output ($ISG_{base\_pow\_elec}$) that was determined at 404. The value of $ISG_{base\_pow\_elec}$ is based on operating the driveline in series mode since the driveline mode change is in progress and not complete. In one example, field current supplied to the ISG is adjusted to provide the requested base ISG electric power amount output via the following equation:

$$\text{ISG\_pow\_cmd} = f1(N, \text{ISG}_{base\_pow\_elec})$$

where ISG_pow_cmd is the ISG power command to supply electric power from the ISG and generate a negative mechanical torque at the engine, the ISG power command may be realized as an adjustment to the ISG field current to generate the requested base ISG electric power amount output ($ISG_{base\_pow\_elec}$), f1 is a function that returns an ISG field current value, N is the engine/ISG speed, and $ISG_{base\_pow\_elec}$ is the requested base ISG electric power amount output. The ISG is operated in an electric power output control mode where the ISG electric power output follows the requested or desired base ISG electric power amount and ISG speed and mechanical load applied by the ISG to the driveline are allowed to vary. Method 400 commands the ISG to provide the desired ISG electric power output and the ISG provides the requested output. Method 400 proceeds to 420.

At 420, method 400 the engine is commanded to generate the base internal combustion engine output power ($E_{base\_pow\_m}$) determined at 404 (including power for driveline losses) plus the additional amount of torque that was determined at 416 to accelerate the engine and the ISG speed to the speed of the traction electric machine. The value of $E_{base\_pow\_m}$ is based on operating the driveline in series mode since the driveline mode change is in progress and not complete. The engine power may be commanded according to the following equation:

$$Eng\_pow\_cmd = E_{base\_pow\_m}(Te\_add - Neng)$$

where Eng_pow_cmd is the commanded engine power, Neng is engine speed, Te_add is the additional torque to accelerate the engine to the traction electric machine speed, and Ebase_pow_m is the base engine output power as determined from driver demand power, and since the driveline is operating in series mode, Ebase_pow_m may be equal to driver demand power, which equals traction electric machine power output, plus power to supply desired amounts of electric power to external electric power consumers via electric power output from the ISG, power to charge the electric energy storage device via electric power output from the ISG, and power to operate electric power consumers of the vehicle via electric power output from the ISG. The engine is commanded by the engine power command. The commanded engine power may be converted to a commanded engine torque by dividing the commanded engine power by the present engine speed. The commanded engine torque may be delivered by the engine via adjusting an engine torque actuator (e.g., throttle, camshaft timing, fuel injection timing, spark timing, etc.). Method 400 proceeds to 422.

At 422, method 400 adjusts ISG field current supplied to the ISG, which may reduce the amount of ISG torque that is applied to the engine, to maintain the requested ISG electric power output at the base ISG electric power amount (ISG$_{base\_pow\_elec}$). Thus, the ISG is operated in an electric power control mode where electric power output of the ISG follows or is equal to a desired electric power amount while ISG speed and mechanical load applied to the engine via the ISG may be allowed to vary to maintain the desired electric power output of the ISG. Because the additional engine torque accelerates the ISG and the engine, the ISG power output may increase unless the amount of field current supplied to the ISG is reduced as ISG speed increases. Consequently, the ISG field current may be adjusted as the ISG accelerates to maintain the ISG electric power output at the value of the base ISG electric power amount (ISG$_{base\_pow\_elec}$). In one example, the amount of field current supplied to the ISG may be determined via referencing a table or function as described at 418 that outputs a field current value that corresponds to an ISG electric power output amount. Method 400 proceeds to 424.

At 424, method 400 adjusts the engine torque as the ISG and engine accelerate toward the speed of the traction electric machine. In one example, the engine is operated in a speed control mode (e.g., a mode where rotational speed is adjusted to a desired rotational speed and where torque of the device is allowed to increase or decrease while the rotational speed of the device is maintained at the desired speed, or alternatively follows the desired speed) and speed feedback is applied to adjust engine torque so that the rate of engine speed change follows the desired rate of engine speed change determined at 412. The engine power may be adjusted according to the following equation:

$$Eng\_pow\_cmd = E_{base\_pow\_m} + ((Te\_add + \alpha(\dot{\omega}_{dsd} - \dot{\omega}_{act})) \cdot Neng)$$

where Eng_pow_cmd is the commanded engine power, Neng is engine speed, Te_add is the additional torque to accelerate the engine to the traction electric machine speed, $\dot{\omega}_{dsd}$ is the desired rate of engine and ISG speed change determined at 412, $\dot{\omega}_{act}$ is the actual rate of engine/ISG speed change, a is a real number (e.g., gain value), and Ebase_pow_m is the base engine output power as determined from driver demand power. Method 400 proceeds to 426.

At 426, method 400 judges if a speed difference across the driveline disconnect clutch (e.g., rotational speed of the input side of the driveline disconnect clutch minus rotational speed of the output side of the driveline disconnect clutch) is less than a threshold speed (e.g., 100 RPM). If so, the answer is yes and method 400 proceeds to 428. If not, method 400 returns to 422.

At 428, method 400 commands and closes the driveline disconnect clutch fully closed. By fully closing the driveline disconnect clutch, the engine and the ISG are mechanically coupled to the traction electric machine and the driveline enters parallel mode. Method 400 proceeds to 430.

At 430, method 400 judges if the driveline disconnect clutch is fully closed. Method 400 may judge that the driveline disconnect clutch is fully closed in response to a driveline disconnect clutch position sensor or output of driveline speed sensors. If method 400 judges that the driveline disconnect clutch is fully closed, the answer is yes and method 400 proceeds to 432. Otherwise, the answer is no and method 400 returns to 428.

At 432, method 400 operates the ISG in an electric power generating mode for most operating conditions, but the ISG may be operated in a torque control mode to supply mechanical torque to the driveline during high driver demand conditions. The engine and the traction electric machine are operated in torque control modes, except the engine may be operated in a speed control mode for very low engine loads. Method 400 also determines the $E_{base\_pow\_m}$, $T_{base\_pow\_m}$, and ISG$_{base\_pow\_elec}$ for parallel driveline mode as described at 404. Method 400 proceeds to 434.

At 434, method 400 commands the engine, ISG, and traction electric machine. The engine and traction electric machine are commanded according to the equation:

$$Eng\_pow\_cmd = E_{base\_pow\_m} = DD_{base\_pow} + ISG_{base\_pow\_elec} - T_{base\_pow\_m}$$

$$T\_pow\_cmd = T_{base\_pow\_m} = DD_{base\_pow} + ISG_{base\_pow\_elec} - E_{base\_pow\_m}$$

$$ISG\_pow\_cmd = ISG_{base\_pow\_elec}$$

where Eng_pow_cmd is the engine power command, T_pow_cmd is the traction electric machine power command, and ISG_pow_cmd is the ISG power command. The engine power command, ISG power command, and traction electric machine are updated as soon as the driveline enters parallel mode. The engine, ISG, and traction electric machine generate the requested power levels. Method 400 proceeds to exit.

At 440, method 400 determines an amount of negative ISG torque (e.g., mechanical torque absorbed from the driveline and converted into electric power) to decrease the rotational speed of the engine and the ISG to the speed of the traction electric machine. In one example, the amount of additional torque to decrease the speed of the engine and the ISG to the speed of the traction electric machine is determined via the following equation:

$$TISG\_add = j_{eng\_ISG} \cdot \dot{\omega}_{dsd}$$

where TISG_add is the additional torque absorbed by the ISG to decelerate the engine and the ISG to the speed of the traction electric machine, $j_{eng\_ISG}$ is the combined inertia of the ISG and the engine, and $\dot{\omega}_{dsd}$ is the rate of speed change from the ISG and engine speed just before the request to close the driveline disconnect clutch and enter parallel driveline mode to the traction electric machine speed. Method 400 proceeds to 442.

At 442, the ISG is commanded to provide the requested base ISG electric power amount output that was determined at 404 plus the additional torque to decelerate the engine and the ISG when the electric energy storage device may accept the additional electric power from the ISG to slow the engine/ISG. In one example, field current supplied to the ISG is adjusted to provide the requested base ISG electric power amount and the torque to decelerate the engine and the ISG.

The ISG electrical output power command may be expressed as:

$$ISG\_pow\_cmd = f2(N_{ISG}, ISG_{base\_pow\_elec}) + f3((N_{ISG}, TISG\_add + \beta(\dot{\omega}_{dsd} - \dot{\omega}_{act}) \cdot N_{ISG}, f2)$$

where ISG_pow_cmd is the ISG electric power command (e.g., an adjustment to field current of the ISG) to supply electric power from the ISG and generate a negative mechanical torque at the engine, ISGbase_pow_elec is the base ISG electric power, $N_{ISG}$ is ISG speed, f2 is a function that returns an ISG field current value that provides the base ISG electric power, f3 is a function that returns an ISG field current value that provides the $((TISG\_add + \beta(\dot{\omega}_{dsd} - \dot{\omega}_{act})) \cdot N_{ISG})$ power.

If the electric energy storage device cannot accept the additional electric power from the ISG during the driveline mode change from series mode to parallel mode, the ISG may be commanded to according to the following equation:

$$ISG\_pow\_cmd = f2(N_{ISG}, ISG_{base\_pow\_elec})$$

where the variables are as previously described. Method 400 proceeds to 444.

At 444, method 400 may store additional electric power from the ISG that is not supplied to the external accessories and the traction electric machine in the electric energy storage device if the electric energy storage device has capacity to store the additional electric power. In addition, if the electric energy storage device lacks capacity to store the additional electric energy generated by the ISG when decelerating the ISG and engine, one or more accessory loads (e.g., resistive window defrosters, etc.) of the vehicle may be activated to consume the excess electric power. However, if the electric energy storage device and accessory loads lack capacity to consume the excess charge generated during deceleration of the engine and ISG, then engine power output may be reduced at 446 and the external power consumers may be supplied with power via the electric energy storage device so that the amount of power delivered to the external power consumers may be maintained even though engine power output is reduced. The amount of engine power that is reduced may be equal to the amount of excess electric power from the ISG that may not be stored in the electric energy storage device, supplied to the traction electric machine, and supplied to external electric power consumers. Method 400 proceeds to 446.

At 446, method 400 commands the engine to generate the base internal combustion engine output power determined at 404 (including power for driveline losses) if excess ISG electric power generated during engine deceleration may be utilized. Thus, the engine may be commanded to generate power according to the following equation:

$$Eng\_pow\_cmd = E_{base\_pow\_m} = DD_{base\_pow} \\ ISG_{base\_pow\_elec} - T_{base\_pow\_m}$$

where the variables are as previously described. On the other hand, if the electric energy storage device may not accept the excess power supplied by the ISG, then the engine power may be commanded according to the following equation:

$$Eng\_pow\_cmd = E_{base\_pow\_m} + ((TISG\_add + \gamma(\dot{\omega}_{dsd} - \dot{\omega}_{act})) \cdot N_{ISG})$$

where the variables are as previously described and γ is a real number scalar (e.g., gain) for closed loop speed control of the engine/ISG speed. Method 400 proceeds to 448.

At 448, method 400 judges if a speed difference across the driveline disconnect clutch (e.g., rotational speed of the input side of the driveline disconnect clutch minus rotational speed of the output side of the driveline disconnect clutch) is less than a threshold speed (e.g., 100 RPM). If so, the answer is yes and method 400 proceeds to 450. If not, method 400 returns to 442.

At 450, method 400 commands and closes the driveline disconnect clutch fully closed. By fully closing the driveline disconnect clutch, the engine and the ISG are mechanically coupled to the traction electric machine and the driveline enters parallel mode. Method 400 proceeds to 452.

At 452, method 400 judges if the driveline disconnect clutch is fully closed. Method 400 may judge that the driveline disconnect clutch is fully closed in response to a driveline disconnect clutch position sensor or output of driveline speed sensors. If method 400 judges that the driveline disconnect clutch is fully closed, the answer is yes and method 400 proceeds to 454. Otherwise, the answer is no and method 400 returns to 450.

At 454, method 400 operates the ISG in an electric power generating mode for most operating conditions, but the ISG may be operated in a torque control mode to supply mechanical torque to the driveline during high driver demand conditions. The engine and the traction electric machine are operated in torque control modes, except the engine may be operated in a speed control mode for very low engine loads. Method 400 proceeds to 460.

At 456, method 400 commands the engine, ISG, and traction electric machine. The engine and traction electric machine are commanded according to the equation:

$$Eng\_pow\_cmd = E_{base\_pow\_m} = DD_{base\_pow} + \\ ISG_{base\_pow\_elec} - T_{base\_pow\_m}$$

$$T\_pow\_cmd = T_{base\_pow\_m} = DD_{base\_pow} + \\ ISG_{base\_pow\_elec} - E_{base\_pow\_m}$$

$$ISG\_pow\_cmd = ISG_{base\_pow\_elec}$$

where Eng_pow_cmd is the engine power command, T_pow_cmd is the traction electric machine power command, and ISG_pow_cmd is the ISG power command. The engine power command, ISG power command, and traction electric machine are updated as soon as the driveline enters parallel mode. The base engine power, base ISG power, and base traction electric machine power may be updated as described at 404 as soon as the driveline enters parallel mode. The engine, ISG, and traction electric machine generate the requested power levels. Method 400 proceeds to exit.

In this way, electrical output of an ISG may be maintained at a desired level that may be constant or varying over time during a driveline mode change from a series mode to a parallel mode. By maintaining the ISG output at the desired level, it may be possible to supply a desired or requested amount of electrical power to electric power consumers that are external to a vehicle. Further, maintaining the ISG output at the desired level may reduce charging and discharging cycles of an electric energy storage device so that a life cycle of the electric energy storage device may be extended.

Thus, the method of FIGS. 4 and 5 provide for a driveline method, comprising: requesting a change from a series driveline mode to a parallel driveline mode via a controller; operating an engine in a speed control mode and a first electric machine in an electric power output control mode responsive to the request; and adjusting a speed of the first electric machine to a speed of a second electric machine while the second electric machine is propelling a vehicle responsive to the request. The method further comprises operating the second electric machine in a torque mode and propelling a vehicle solely via the second electric machine while operating in the series driveline mode. The method further comprises closing a driveline disconnect clutch when the speed of the first electric machine is within a threshold speed of the second electric machine, the first electric machine directly coupled to the engine and the driveline disconnect clutch. The method includes where the second electric machine is directly coupled to the driveline disconnect clutch and a gearbox.

In some examples, the method further comprises supplying electric power from the first electric machine to an electric energy storage device while changing from the series driveline mode to the parallel driveline mode. The method further comprises commanding the engine to a first torque that is a sum of a torque to provide a desired amount of electric power from the first electric machine torque plus a torque to accelerate the engine and the first electric machine to the speed of the second electric machine. The method includes where the desired amount of electric power from the first electric machine includes an amount of electric power supplied to the second electric machine.

The method of FIGS. 4 and 5 also provides for a driveline operating method, comprising: requesting a change from a series driveline operating mode to a parallel driveline operating mode via a controller; operating an engine in a speed control mode and a first electric machine in an electric power output control mode in response to the requested change to the parallel driveline operating mode; adjusting a speed of the first electric machine to a speed of a second electric machine in response to the requested change to the parallel driveline operating mode; and increasing the speed the first electric machine and the engine to the speed of the second electric machine at a rate of speed that is a function of vehicle operating mode. The method includes where the rate of speed increase is greater for a performance mode than for an economy mode. The method further comprises maintaining an amount of electric power supplied to an external electric power consumer via the first electric machine during the change from the to the series mode to the parallel mode. The method further comprises increasing the speed rate of change of the first electric machine to the speed of the second electric machine as a function of accelerator pedal position rate of change. The method further comprises increasing the speed rate of change of the first electric machine to the speed of the second electric machine as a function of electric energy storage device power limits. The method includes where the speed of the first electric machine is adjusted via increasing power and/or torque output of the engine. The method further comprises commanding a driveline disconnect clutch closed in response to the speed of the first machine being within a threshold speed of the speed of the second electric machine.

Referring now to FIG. 6A, an example function for adjusting a rate of engine/ISG speed as a function of accelerator pedal position is shown. The function 600 may be stored in controller memory and it may be referenced by the method of FIGS. 4 and 5. Function 600 includes a vertical axis and a horizontal axis. The vertical axis represents a desired or requested rate of engine/ISG speed change and the requested rate of engine/ISG speed change increases in the direction of the vertical arrow. The horizontal axis represents accelerator pedal position and the accelerator pedal position increases in the direction of the horizontal axis arrow.

Curve 602 represents one example relationship between accelerator pedal position and the rate of engine/ISG speed change from the present engine/ISG speed to the speed of the traction electric machine during a mode change from a series driveline mode to a parallel driveline mode. Curve 602 begins at a middle level and it increases with increasing accelerator pedal position. Curve 602 may shorten mode changes from series mode to parallel mode when the vehicle's human driver is demanding higher vehicle power output levels. Consequently, additional vehicle power output may be provided in a shorter amount of time, thereby improving vehicle performance. For lower accelerator pedal positions, the change from series mode to parallel mode may take place over a longer period of time so that less energy may be applied to accelerate the driveline components, thereby improving driveline efficiency. Function 600 may be referenced via accelerator pedal position and it may output a desired rate of engine/ISG speed change.

Referring now to FIG. 6B, an example function for adjusting a rate of engine/ISG speed as a function of vehicle or driveline operating mode is shown. The function 650 may be stored in controller memory and it may be referenced by the method of FIGS. 4 and 5. Function 650 includes a vertical axis and a horizontal axis. The vertical axis represents a value of a first adjustment factor and the value of the first adjustment factor may increase in the direction of the vertical arrow. The horizontal axis represents vehicle operating mode and the vehicle may be engaged in an energy conservation mode or a performance mode.

Curve 604 represents one example relationship between vehicle economy and performance modes and the value of the first adjustment factor. Curve 604 begins at a middle level when the vehicle is engaged in economy mode and it increases to a value of one when the vehicle is engaged in a performance mode. The output of function 600 may be multiplied by the output of function 650 to provide an adjusted desired rate of speed change of the engine/ISG. Curve 604 may not modify rate of speed changes when the vehicle is operating in performance mode, but curve 604 may reduce rates of speed changes when the vehicle is operating in economy mode. By reducing rates of speed change, less energy may be applied to accelerate the engine and ISG to the speed of the traction electric machine.

Function 650 may be referenced via the vehicle operating mode and it may output a value of the first adjustment factor.

Referring now to FIG. 6C, an example function for adjusting a rate of engine/ISG speed as a function of vehicle or driveline operating mode is shown. The function 660 may be stored in controller memory and it may be referenced by the method of FIGS. 4 and 5. Function 660 includes a vertical axis and a horizontal axis. The vertical axis represents a value of a second adjustment factor and the value of the second adjustment factor may increase in the direction of the vertical arrow. The horizontal axis represents vehicle operating mode and the vehicle may be engaged in an energy conservation mode or a performance mode.

Curve 606 represents one example relationship between vehicle electric power limits (e.g., threshold amounts of electrical power that may not be exceeded or be less than) and the value of the second adjustment factor. Curve 606 begins at a value of one and then it decreases as the vehicle electric power limit threshold 620 is approached. The output of function 660 may be multiplied by the output of function 650 to provide an adjusted desired rate of speed change of the engine/ISG. Curve 606 reduces rates of speed changes when the vehicle electric power limits approach vehicle power limit threshold 620. By reducing rates of speed change, less energy may be applied to accelerate the engine and ISG so that there may be less of a possibility of exceeding vehicle power limits. Function 660 may be referenced via the vehicle operating mode and it may output a value of the second adjustment factor.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, single cylinder, I3, I4, I5, V6, V8, V10, and V12 engines operating in natural gas, gasoline, diesel, or alternative fuel configurations could use the present description to advantage.

The invention claimed is:

1. A driveline method, comprising:
   requesting a change from a series driveline mode to a parallel driveline mode via a controller;
   operating an engine in a speed control mode and a first electric machine in an electric power output control mode responsive to the request;
   adjusting a speed of the first electric machine to a speed of a second electric machine while the second electric machine is propelling a vehicle responsive to the request; and
   closing a driveline disconnect clutch when the speed of the first electric machine is within a threshold speed of the second electric machine, the first electric machine directly coupled to the engine and the driveline disconnect clutch.

2. The method of claim 1, further comprising operating the second electric machine in a torque mode and propelling a vehicle solely via the second electric machine while operating in the series driveline mode.

3. The method of claim 1, where the second electric machine is directly coupled to the driveline disconnect clutch and a gearbox.

4. A driveline method, comprising:
   requesting a change from a series driveline mode to a parallel driveline mode via a controller;
   operating an engine in a speed control mode and a first electric machine in an electric power output control mode responsive to the request;
   adjusting a speed of the first electric machine to a speed of a second electric machine while the second electric machine is propelling a vehicle responsive to the request; and
   supplying electric power from the first electric machine to an electric energy storage device while changing from the series driveline mode to the parallel driveline mode.

5. The method of claim 1, further comprising commanding the engine to a first torque that is a sum of a torque to provide a desired amount of electric power from the first electric machine torque plus a torque to accelerate the engine and the first electric machine to the speed of the second electric machine.

6. The method of claim 5, where the desired amount of electric power from the first electric machine includes an amount of electric power supplied to the second electric machine.

7. A driveline operating method, comprising:
   requesting a change from a series driveline operating mode to a parallel driveline operating mode via a controller;
   operating an engine in a speed control mode and a first electric machine in an electric power output control mode in response to the requested change to the parallel driveline operating mode;
   adjusting a speed of the first electric machine to a speed of a second electric machine in response to the requested change to the parallel driveline operating mode; and
   increasing the speed of the first electric machine and the engine to the speed of the second electric machine at a rate of speed that is a function of vehicle operating mode, where the rate of speed increase is greater for a performance mode than for an economy mode.

8. The method of claim 7, further comprising maintaining an amount of electric power supplied to an external electric power consumer via the first electric machine during the change from the to the series mode to the parallel mode.

9. A driveline operating method, comprising:

requesting a change from a series driveline operating mode to a parallel driveline operating mode via a controller;

operating an engine in a speed control mode and a first electric machine in an electric power output control mode in response to the requested change to the parallel driveline operating mode;

adjusting a speed of the first electric machine to a speed of a second electric machine in response to the requested change to the parallel driveline operating mode; and increasing the speed of the first electric machine and the engine to the speed of the second electric machine at a rate of speed that is a function of vehicle operating mode; and at least one of increasing the speed rate of change of the first electric machine to the speed of the second electric machine as a function of accelerator pedal position rate of change, and increasing the speed rate of change of the first electric machine to the speed of the second electric machine as a function of electric energy storage device power limits.

10. The method of claim 7, where the speed of the first electric machine is adjusted via increasing power output of the engine.

11. The method of claim 7, further comprising commanding a driveline disconnect clutch closed in response to the speed of the first machine being within a threshold speed of the speed of the second electric machine.

12. A system, comprising:
an engine;
a driveline disconnect clutch;
a first electric machine directly coupled to the engine when the driveline disconnect clutch is fully open;
a second electric machine coupled to the driveline disconnect clutch and a gearbox when the driveline disconnect clutch is fully open; and
a controller including executable instructions stored in non-transitory memory to request change from operating a driveline in a series mode to operating the driveline in a parallel mode, and instructions to operate the engine in a speed control mode and the first electric machine in an electric power control mode in response to the request to change from operating the driveline in the series mode to operating the driveline in the parallel mode, and additional instructions to maintain electric power supplied via the first electric machine to electric power consumers in response to the requested change.

13. The system of claim 12, further comprising additional instructions to adjust a rate of change of speed of the first electric machine from a first speed to a second speed.

14. The system of claim 13, where the second speed is a speed of the second electric machine.

15. The system of claim 12, further comprising additional instructions to fully close the driveline disconnect clutch in response to a speed of the first electric machine being within a threshold speed of a speed of the second electric machine.

16. The system of claim 12, further comprising additional instructions to command the engine to a power that is a base engine power plus an additive torque when an electric energy storage device lacks capacity to store electric power generated by the first electric machine.

* * * * *